(12) United States Patent
Gilbertson

(10) Patent No.: US 6,542,120 B1
(45) Date of Patent: Apr. 1, 2003

(54) SOLAR POWERED GPS DEVICE

(76) Inventor: W. Kyle Gilbertson, P.O. Box 982151, Park City, UT (US) 84098

( * ) Notice: Subject to any disclaimer, the term of this patent is extended or adjusted under 35 U.S.C. 154(b) by 0 days.

(21) Appl. No.: 09/944,044

(22) Filed: Aug. 31, 2001

(51) Int. Cl.[7] .............................. G01S 5/02; G01S 5/04; G01S 5/14; G04B 1/00
(52) U.S. Cl. ................. 342/419; 342/357.06; 342/443; 368/205
(58) Field of Search ..................... 342/357.07, 357.06, 342/357.12, 419, 443; 368/205

(56) References Cited

U.S. PATENT DOCUMENTS

| | | | |
|---|---|---|---|
| 4,261,049 A | * | 4/1981 | Komiyama et al. ......... 368/205 |
| 5,389,934 A | * | 2/1995 | Kass .................... 342/357.07 |
| 5,546,092 A | * | 8/1996 | Kurokawa et al. ......... 340/988 |
| 5,572,489 A | * | 11/1996 | Born et al. .................... 368/21 |
| 5,627,548 A | * | 5/1997 | Woo et al. .................. 342/352 |
| 5,652,570 A | | 7/1997 | Lepkofker |
| D389,071 S | | 1/1998 | Giardiello |
| 5,745,440 A | * | 4/1998 | Chen ........................... 368/21 |
| 5,748,148 A | * | 5/1998 | Heiser et al. .......... 340/825.49 |
| 5,781,155 A | | 7/1998 | Woo et al. |
| 5,790,477 A | | 8/1998 | Hauke |
| 5,852,401 A | | 12/1998 | Kita |
| 5,905,460 A | | 5/1999 | Odagiri et al. |
| 5,905,461 A | * | 5/1999 | Neher ................... 342/357.07 |
| 5,982,710 A | * | 11/1999 | Rawat et al. ................. 368/21 |
| 6,405,213 B1 | * | 6/2002 | Layson et al. .............. 340/539 |

FOREIGN PATENT DOCUMENTS

| | | | | |
|---|---|---|---|---|
| DE | 029922505 U1 | * | 7/2000 | .......... G04G/19/00 |
| EP | 0788037 A1 | * | 8/1997 | .......... G04B/19/06 |

* cited by examiner

*Primary Examiner*—Gregory C. Issing

(57) ABSTRACT

A solar powered GPS device for receiving GPS signals transmitted from GPS satellites in order to determine a time of day. The solar powered GPS device includes a housing that has an interior. A GPS assembly is mounted in the housing for receiving GPS signals from GPS satellites. A clock display is mounted on the housing for displaying a time of day. The clock display comprises a generally semi-transparent material for allowing a light to pass through the clock display. A solar panel is mounted in the interior of the housing for converting the light passing through the clock display into an electric current in order to power the GPS assembly

17 Claims, 3 Drawing Sheets

SOLAR POWERED GPS DEVICE

BACKGROUND OF THE INVENTION

1. Field of the Invention

The present invention relates to global positioning systems (GPS) and more particularly pertains to a new solar powered GPS device for receiving GPS signals transmitted from GPS satellites in order to determine a local time of day by determining a user's position on the Earth's surface.

2. Description of the Prior Art

The use of GPS is known in the prior art. More specifically, GPS heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,905,460; U.S. Pat. No. 5,790,477; U.S. Pat. No. 5,781,155; U.S. Pat. No. 5,852.401; U.S. Pat. No. Des. 389,071; and U.S. Pat. No. 5,652.570.

While these device's fulfill their respective, particular objectives and requirements, the aforementioned patents do not disclose a new solar powered GPS device. The inventive device includes a housing that has an interior. A GPS assembly is mounted in the interior of the housing for receiving GPS signals from GPS satellites. A clock display is mounted on the housing for displaying a time of day determined from reception of the GPS signals. The clock display comprises a generally semi-transparent material for allowing a light to pass through the clock display. A solar panel is mounted in the interior of the housing for converting the light passing through the clock display into an electric current and providing power to the GPS assembly.

In these respects, the solar powered GPS device according to the present invention substantially departs from the conventional concepts and designs of the prior art, and in so doing provides an apparatus primarily developed for the purpose of receiving GPS signals transmitted from GPS to determine a time of day.

SUMMARY OF THE INVENTION

In view of the foregoing disadvantages inherent in the known types of GPS now present in the prior art, the present invention provides a new solar powered GPS device construction wherein the same can be utilized for receiving GPS signals transmitted from GPS satellites for determining a local time of day.

The general purpose of the present invention, which will be described subsequently in greater detail, is to provide a new solar powered GPS device apparatus and method which has many of the advantages of the GPS mentioned heretofore and many novel features that result in a new solar powered GPS device which is not anticipated, rendered obvious, suggested, or even implied by any of the prior art GPS, either alone or in any combination thereof.

To attain this, the present invention generally comprises a new solar powered GPS device. The inventive device includes a housing that has an interior. A GPS assembly is mounted in the interior of the housing for receiving GPS signals from GPS satellites. A clock display is mounted on the housing for displaying a time of day determined from reception of the GPS signals. The clock display comprises a generally semi-transparent material for allowing a light to pass through the clock display. A solar panel is mounted in the interior of the housing for converting the light passing through the clock display into an electric current and providing power to the GPS assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar powered GPS device apparatus and method which has many of the advantages of the GPS mentioned heretofore and many novel features that result in a new solar powered GPS device which is not anticipated, rendered obvious, suggested, or even implied by any of the prior art global positioning systems, either alone or in any combination thereof.

It is another object of the present invention to provide a new solar powered GPS device which may be easily and efficiently manufactured and marketed.

It is a further object of the present invention to provide a new solar powered GPS device which is of a durable and reliable construction.

An even further object of the present invention is to provide a new solar powered GPS device which is susceptible of a low cost of manufacture with regard to both materials and labor, and which accordingly is then susceptible of low prices of sale to the consuming public, thereby making such solar powered GPS device economically available to the buying public.

Still vet another object of the present invention is to provide a new solar powered GPS device which provides in the apparatuses and methods of the prior art some of the advantages thereof, while simultaneously overcoming some of the disadvantages normally associated therewith.

Still another object of the present invention is to provide a new solar powered GPS device for receiving GPS signals transmitted from GPS satellites and for determining a local time of day by determining a user's position on the Earth's surface.

Yet another object of the present invention is to provide a new solar powered GPS device which includes a housing that has an interior. A GPS assembly is mounted in the interior of the housing for receiving GPS signals from GPS satellites. A clock display is mounted on the housing for displaying a time of day determined from reception of the GPS signals. The clock display comprises a generally semi-transparent material for allowing a light to pass through the clock display. A solar panel is mounted in the interior of the housing for converting the light passing through the clock display into an electric current and providing power to the GPS assembly.

Still yet another object of the present invention is to provide a new solar powered GPS device that resets the time automatically every time the solar powered GPS device receives at least one GPS signal from at least one GPS satellite. The time may be reset with respect to the time zone the user is in if the present invention receives GPS signals from at least four GPS satellites. Reception of GPS signals from fewer than four GPS satellites results in the present invention setting the time according to the last time zone in which it received GPS signals from at least four GPS satellites.

Even still another object of the present invention is to provide a new solar powered GPS device that, unlike the prior art which employs a patch antenna that must be isolated from the control circuitry of the GPS watch making the GPS watch bulky, employs a wire ring antenna. The wire ring antenna can be incorporated into the design of the watch, making it less bulky. The wire ring antenna does not interfere with the GPS electronics making the present invention more compact and easier to wear.

Even still yet another object of the present invention is to provide a new solar powered GPS device that employs solar power to reduce the need to have a large bulky battery. Although the present invention may employ a battery as an auxiliary power supply, it may be smaller and use less room than conventional watch batteries.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
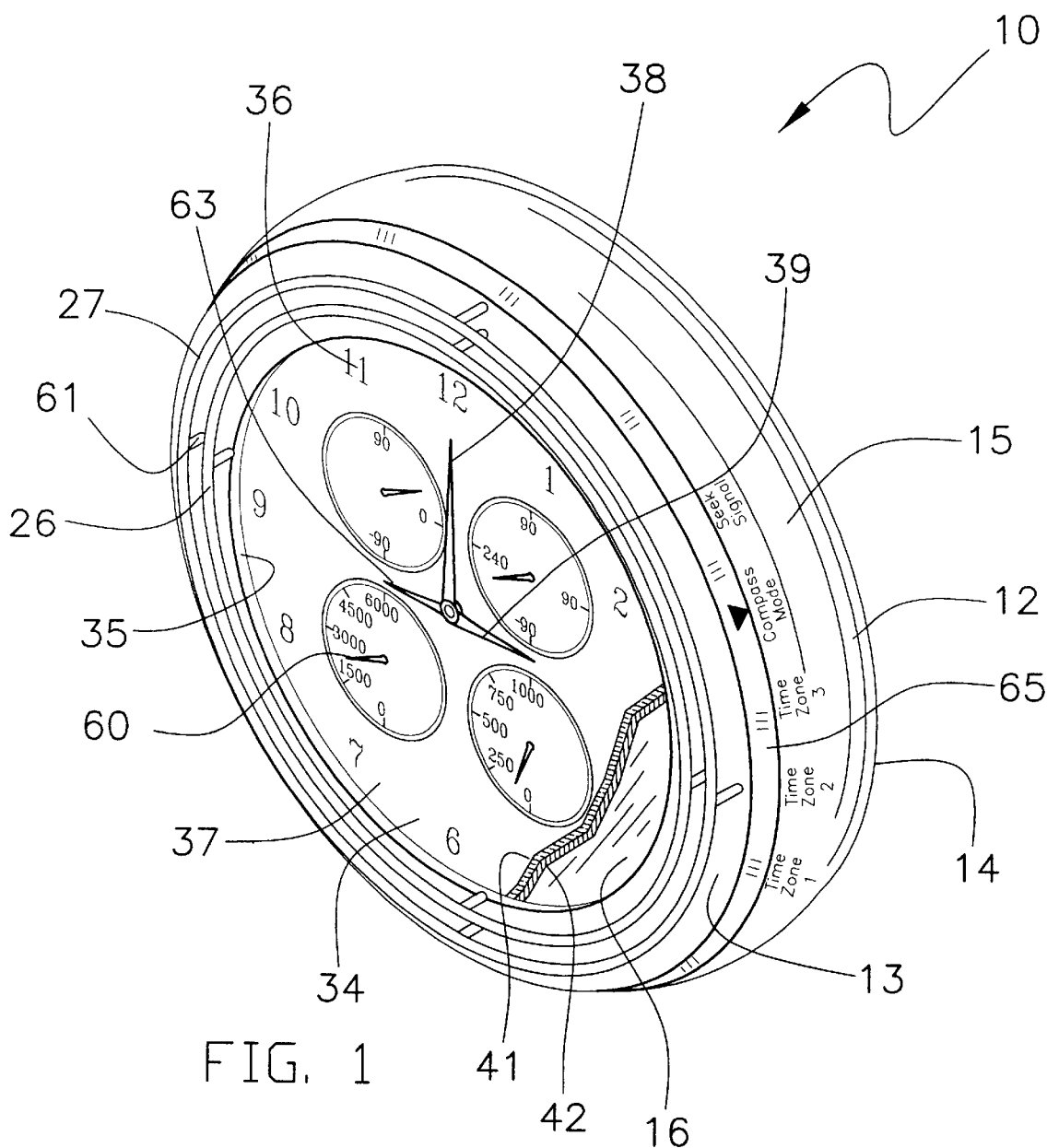
FIG. 1 is a schematic perspective view of a new solar powered GPS device according to the present invention.
Figure 2:
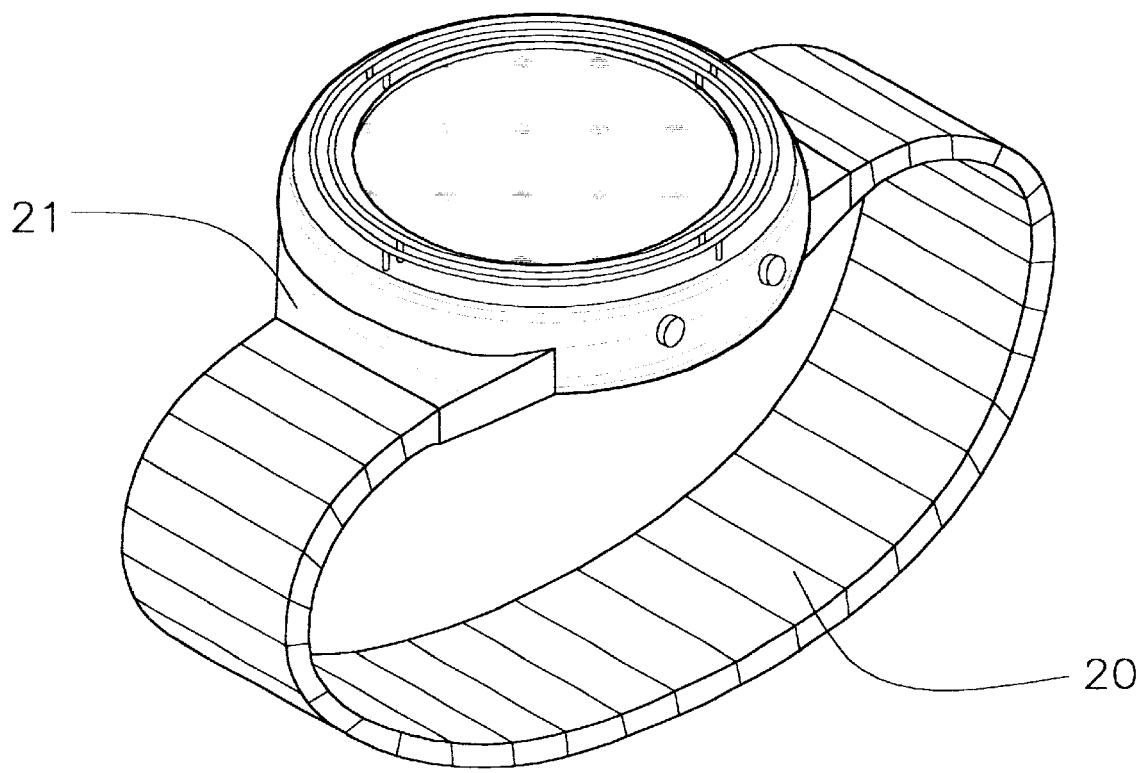
FIG. 2 is a schematic perspective view of an alternate embodiment of the present invention.
Figure 3:
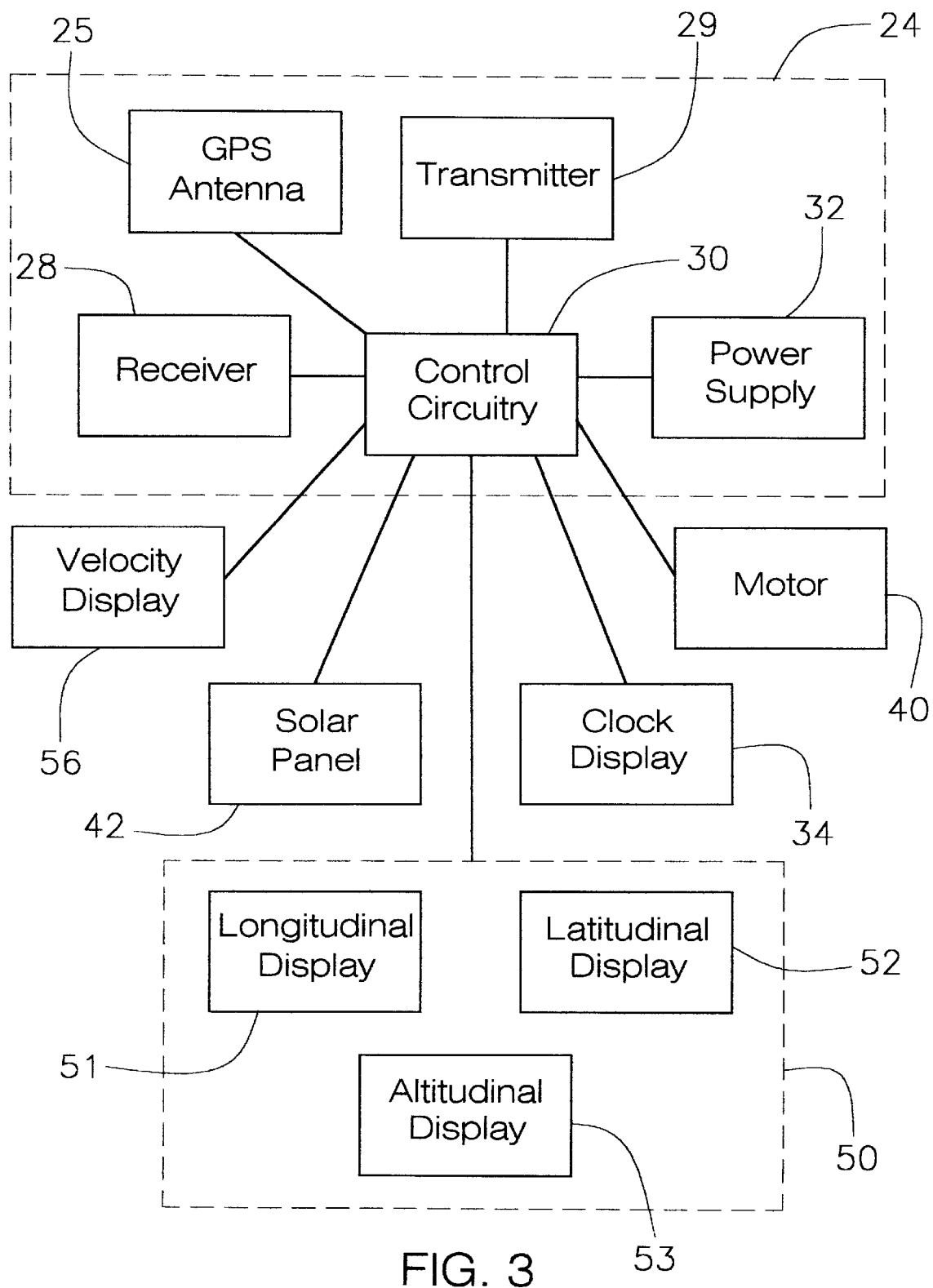
FIG. 3 is a schematic diagram of the present invention.

With reference now to the drawings, and in particular to FIGS. 1 through 3 thereof, a new solar powered GPS device embodying the principles and concepts of the present invention and generally designated by the reference numeral 10 will be described.

As best illustrated in FIGS. 1 through 3, the solar powered GPS device 10 generally comprises a housing 12 that includes a front wall 13 and a back wall 14. A peripheral wall 15 extends between the front 13 and back 14 walls defining an interior 16 of the housing 12.

The housing 12 may have a height measuring approximately one inch between the front wall 13 and the back wall 14 of the housing 12. The housing 12 may also have diameter measuring approximately three to four inches. The size of the housing 12 is only constrained by the size of the technology required to operate the solar powered GPS device 10.

The housing 12 may comprise a substantially rigid material such as, for example, titanium, aluminum, or steel. The housing 12 may also comprise any precious metals such as, for example, gold or silver. Any rigid plastic materials may also be employed. The housing 12 may additionally be water resistant to permit the solar powered GPS device 10 to be submergible in water.

In one embodiment of the present invention, as particularly illustrated in FIG. 2, a securing means 20 may be provided for removably securing the housing 12 to a user. The securing means may include a pair of opposite ends 21 with at least one of the ends 21 being mounted on the peripheral wall 15 of the housing 12.

In one embodiment of the present invention, each of the ends 21 may be mounted on and positioned on diametrically opposed sides of the housing 12. The securing means 20 may comprise a wristband. The wristband may comprise a cloth, leather or metallic material. The securing means 20 may also comprise a chain for securing the solar powered GPS device 10 to clothing of a user.

A GPS assembly 24 is provided for receiving GPS signals from GPS satellites. The GPS assembly 24 may include at least one GPS antenna 25 for receiving GPS signals. The GPS antenna 25 may be mounted on the front wall 13 of the housing 12. However, the GPS antenna 25 may be mounted on any location on the housing 12 where it can receive GPS signals.

The GPS antenna 25 includes an L1 GPS 26 antenna that is designed for receiving L1 GPS signals which carry information about a time of day as well as information permitting a user to determine the user's position on the Earth's surface.

The GPS antenna 25 may include an L2 GPS antenna 27 that is designed for receiving L2 GPS signals which carry information primarily used by military users. The solar powered GPS device 10 may employ the L1 GPS antenna 26 and the L2 GPS antenna 27.

The GPS antenna 25 preferably comprises a wire ring antenna that may be used in conjunction with the necessary electronics needed to operate the solar powered GPS device 10. The diameter of the wire ring antenna is correlated with the wavelength of the particular GPS signals being received. The L1 GPS signal has a frequency of 1575.42 MHz and a wavelength of 190.34 millimeters. The wavelength of the L1 GPS signal requires a ring diameter of 60.6 millimeters. The L2 signal has a frequency of 1227.64 MHz and a wavelength of 244.21 millimeter. The wavelength of the L2 GPS signal requires airing diameter of 77.73 millimeters. The diameter of the wire ring antenna may be reduced by capacitance matching to resonant frequency. However, capacitance matching to resonant frequency may result in reduced signal gain.

Although a wire ring antenna is preferably used in the present invention, patch antennas may also be employed. A patch antenna may be mounted on the peripheral wall 15 of the housing 12. A pair of patch antennas designed to receive the L1 and L2 GPS signals may be employed and may be mounted on the peripheral wall 15 of the housing 12.

The GPS antenna 25 may include a plurality of foot portions 61 that may be coupled to the front wall 13 of the housing 12. Each of the foot portions 61 may extend through the front wall 13 of the housing 12 and may be electrically connected to control circuitry 30 mounted in the interior 16 of the housing 12. The foot portions 60 may position the GPS antenna 25 approximately 9 millimeters above the front wall 13 of the housing 12. The height of the GPS antenna from the front wall 13 of the housing may be reduced, however, it may also reduce signal gain;

A receiver 28 is provided for receiving GPS signals from the GPS antenna 25. The receiver 28 may be mounted in the interior 16 of the housing 12. The GPS assembly 24 may employ a receiver 28 such as, for example, the GPS-MS1 receiver by μ-Blox AG which utilizes a GPS1/LX chipset. The receiver 28 is electronically connected to the control circuitry 30 that is mounted in the interior 16 of the housing 12.

A power supply 32 may,be provided for selectively providing power to the control circuitry 30. The power supply 32 is removably mounted in the interior 16 of the housing 12. The power supply 32 may comprise a rechargeable battery. Additionally, the power supply 32 may comprise a titanium rechargeable battery for providing extended life and increased use of the solar powered GPS receiving device 10. The receiver 28 may be designed to seek GPS signals periodically, such as, for example, every second in order to conserve power. The receiver 28 may also be designed to be inactive when there are low power resources. When the receiver 28 is inactive a user may manually activated it to seek GPS signals.

A clock display 34 is provided for displaying a time of day. The clock display 34 is mounted on the front wall 13 of the housing 12 such that the GPS antenna 25 is positioned generally adjacent to a perimeter edge 35 of the clock display 34. The clock display 34 is electrically connected to the control circuitry 30 such that the control circuitry 30 automatically sets the time of day when it receives GPS signals from at least one GPS satellite.

The clock display 34 may include a generally circular shape, however, the clock display 34 may employ a variety of shapes. The clock display 34 preferably comprises a semi-transparent material, such as, for example, a ceramic that permits sunlight to pass through it into the interior 16 of the housing 12.

In one embodiment of the present invention, the clock display 34 includes numerical indicia 36 marked on an outer surface 37 of the clock display 34. The numerical indicia 36 is spaced apart from each other and positioned generally adjacent to the perimeter edge 35 of the clock display 34. As particularly illustrated in FIG. 1, the clock display 34 may include an hour hand 38 and a minute hand 39 that are rotatably mounted on a central portion of the clock display 34 such that the hour hand 38 and minute 39 hands point at the numerical indicia 36 for displaying a time of day to a user. In one embodiment of the present invention, the clock display 34 may also employ a digital display for digitally displaying to a user the time of day.

A motor 40 may be mounted in the interior 16 of housing 12 for rotatably turning the hour 38 and minute 39 hands. The motor 40 is operationally coupled to the hour 38 and minute 39 hands and may be electrically connected to the control circuitry 30. The motor 40 may comprise micro motors that provide efficient operation of the solar powered GPS device 10 without straining power resources.

In one embodiment of the present invention, a second hand 63 may be mounted to the motor 40 for pointing at the numerical indicia 36 marked on the clock display 34 and indicating seconds of a day. The second hand 63 may be positioned generally adjacent to the hour 38 and minute 39 hands.

In one embodiment of the present invention, the second hand 63 may be designed to act as a compass pointing toward the north magnetic pole of the Earth. The second hand 63 would point toward the north magnetic pole of the Earth permitting a user to determine a direction of travel.

A solar panel 42 is provided for converting the light passing through the clock display 34 into an electric current to provide power to the control circuitry 30. The solar panel 42 is preferably mounted in the interior 16 of the housing 12 and may be positioned generally adjacent to the clock display 34. The solar panel 42 is electrically connected to the control circuitry 30 which controls the recharging of the power supply 32 which is used when there is no light to run the solar powered GPS device 10. The solar panel 42 may comprise a photovoltaic cell however, other types of solar panels may be employed.

A crystal 41 may be provided for protecting the clock display 34 from damage. The crystal 41 is preferably mounted on the front wall 13 of the housing 12 such that the clock display 34 is positioned between the crystal 41 and the back wall 14 of the housing 12. The crystal preferably comprises a transparent material such that the clock display 34 is visible through the crystal 41.

An actuating means 65 may be rotatably mounted on the front wall 13 of the housing 12 for controlling the control circuitry 30. The actuating means 65 may be positionable between a plurality of time zone positions and for an embodiment having a second hand 63, a compass position. The plurality of time zone positions are characterized by a user rotatably turning the actuating means 65 to a particular time zone indicated on the front wall 13 of the housing 12, wherein the control circuitry 30 calculates the particular time in the selected time zone from the GPS signal received. The compass position is characterized by a user rotatably turning the actuating means 65 to a compass position indicated on the front wall 13 of the housing 12, wherein the second hand 63 stops pointing at the numerical indicia 36 of the clock display 36 and points toward the north magnetic pole of the Earth.

The control circuitry 30 sets the time of day when the receiver 28 receives GPS signals from at least one GPS satellite. When the receiver 28 receives GPS signals from at least four GPS satellites it will set the time of day in the,particular time zone where the user is located. However, when the receiver 28 receives a GPS signal from only one GPS satellite, the control circuitry 30 will maintain the time of day from the last time zone that the receiver 28 received GPS signals from at least four GPS satellites.

In an alternate embodiment of the present invention, a positioning display assembly 50 may be provided for displaying a user's positioning on the earth's surface. The positioning display assembly 50 is electrically connected to the control circuitry 30. The positioning display assembly 50 may comprise a longitudinal display 51 for displaying a user's positioning with respect to a Prime Meridian of the Earth. The longitudinal display 51 may be mounted on the clock display 34 and may have a diameter generally smaller than the clock display 34.

The positioning display assembly 50 may also include a latitudinal display 52 for displaying a user's positioning with respect to an Equator of the Earth. The latitudinal display 52 may be mounted on the clock display 34 and may be positioned generally adjacent to the longitudinal display 51. The latitudinal display 52 may have a diameter generally smaller than the clock display 34. In one embodiment of the present invention, the longitudinal 51 and latitudinal 52 displays may be combined into a single display.

The positioning display assembly 50 may additionally include an altitudinal display 53 for displaying a user's altitude with respect to a mean sea level of the Earth. The altitudinal display 53 may be mounted on the clock display 34 and may be positioned generally adjacent to the latitudinal display 52. The altitudinal display 53 may have a diameter generally smaller than the clock display 34 In one embodiment of the present invention, the longitudinal 51, latitudinal 52 and altitudinal 53 displays are used by a user to determine the user's positioning on the Earth's surface. A user's position may be calculated when the receiver 28 receives GPS signals from at least four GPS satellites.

A velocity display 56 may be provided for displaying a user's velocity between a pair of points traveled by the user. The velocity display 56 may be mounted on the clock display 34 and may be positioned generally adjacent to the altitudinal 53 and longitudinal 51 displays. The velocity display 56 is electrically connected to the control circuitry 30. In one embodiment of the present invention, the velocity display 56 may be combined with the altitudinal display 53 into a single display.

In one embodiment of the present invention, the latitudinal 52, longitudinal 51, altitudinal 53 and velocity 56 displays may include numerical indicia 57 marked on each of the displays 51, 52, 53 and 56 for displaying a latitude 52, longitude 51, altitude 53 and velocity 56. The numerical indicia 57 for each of the displays 51, 52, 53 and 56 is generally spaced apart and are positioned generally adjacent to a perimeter edge 58 of each of the displays 51, 52, 53 and 56.

In one embodiment of the present invention, the latitudinal 52, longitudinal 51, altitudinal 53 and velocity 56 displays include at least one indicator hand 60 for pointing at the numerical indicia 57 on each of the displays 51, 52, 53 and 56 for indicating a latitude 51, longitude 52, altitude 53 and velocity 56 to a user.

In use, the solar powered GPS device 10 receives GPS signals which automatically sets the clock display 34 to the local time zone where the user is on the Earth s surface. In an embodiment of the present invention having a positioning display assembly 50, a user determines their location on the Earth's surface by reading the longitudinal 51 and latitudinal 52 displays. The user may also determine their altitudinal position by reading the altitudinal display 53 and their velocity by reading the velocity display 56.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar powered GPS device for receiving GPS signals transmitted from GPS satellites in order to determine a local time of day by determining a user's position on the Earth's surface, said device comprising:

a housing having an interior;

a GPS assembly mounted in said interior of said housing for receiving GPS signals from GPS satellites;

a clock display being mounted on said housing for displaying a time of day, said clock display being electrically connected to said GPS assembly such that a time of day is set by reception of GPS signals;

said clock display comprising a generally semi-transparent material for allowing a light to pass through said clock display; and a solar panel for converting the light passing through said clock display into an electric current, the electric current providing power to said GPS assembly, said solar panel being mounted in said interior of said housing, said solar panel being electrically connected to said GPS assembly;

wherein said GPS assembly includes control circuitry being mounted in said interior of said housing for controlling said solar panel and clock display;

an hour hand, a minute hand, and a second hand each being rotatably mounted on said clock display such that said hour, minute and second hands point extending outwardly from a central point for displaying hours, minutes and seconds of a time of day to a user;

a motor being mounted in said interior of housing for rotatably turning said hour, minute, and second hands;

wherein said GPS assembly includes an actuating means for controlling said control circuitry, said actuating means having a time position for selecting one of a plurality of time zones, wherein a user may select a particular time zone to determine a time of day in the selected time zone; and wherein said actuating means is positionable from said time position to a compass position said second hand being adapted for pointing toward a north magnetic pole of earth when said actuating means is positioned in said compass position whereby said second hand forms a compass.

2. The solar powered GPS device of claim 1, additionally including a securing means for removably securing said housing to a user said securing means having a pair of opposite ends, at least one of said ends being mounted on a peripheral wall of said housing.

3. The solar powered GPS device of claim 1, wherein said GPS assembly further comprises:

at least one GPS antenna mounted on a front wall of said housing for receiving GPS signals;

a receiver being mounted in said interior of said housing for receiving GPS signals from GPS satellites;

said control circuitry controlling said receiver.

4. The solar powered GPS device of claim 3, wherein said at least one GPS antenna comprises a GPS antenna being adapted for receiving L1 GPS signals.

5. The solar powered GPS device of claim 4, wherein said at least one GPS antenna comprises a GPS antenna being adapted for receiving L2 GPS signals.

6. The solar powered GPS device of claim 3, wherein said at least one GPS antenna comprises a wire ring antenna.

7. The solar powered GPS device of claim 6, wherein said at least one GPS antenna having a plurality of foot portions being coupled to said front wall of said housing, each of said foot portions extending through said front wall of said housing and being electrically connected to said control circuitry.

8. The solar powered GPS device of claim 1, wherein said clock display includes numerical indicia being marked on an outer surface of said clock display.

9. The solar powered GPS device of claim 1 wherein said actuating means is rotatably mounted on a front wall of said housing.

10. The solar powered GPS device of claim 1, additionally including a power supply being mounted in said interior of said housing for receiving said electric current produced by said solar panel.

11. The solar powered GPS device of claim 1, additionally including a crystal for protecting said clock display, said crystal being mounted on said front wall of said housing such that said clock display being positioned generally between said crystal and said housing.

12. The solar powered GPS device of claim 1, wherein said solar panel comprises a photovoltaic cell.

13. The solar powered GPS device of claim 1, additionally including a positioning display assembly for displaying a user's positioning on the Earth's surface, said positioning display assembly being mounted on said clock display and electrically connected to said GPS assembly.

14. The solar powered GPS device of claim 13, wherein said positioning display assembly comprises a velocity display for displaying a user's velocity between a pair of points traveled by the user.

15. The solar powered GPS device of claim 13, wherein said positioning display assemble comprises longitudinal and latitudinal displays for displaying a user's longitudinal and latitudinal position on the Earth's surface.

16. The solar powered GPS device of claim 13, wherein said positioning display assembly comprises an altitudinal display for displaying a user's altitude with respect to a mean sea level of the Earth.

17. A solar powered GPS device for receiving GPS signals transmitted from GPS satellites and for determining a local time of day by finding a user's position on the Earth's surface, said device comprising:

a housing having a front wall, a back wall and a peripheral wall extending between said front and back walls defining an interior of said housing;

said housing comprising a substantially rigid material;

a securing means for removably securing said housing to a wrist of a user, said securing means having a pair of opposite ends, each of said ends being mounted on said peripheral wall of said housing, each of said ends being positioned on diametrically opposed sides of said housing;

wherein said securing means comprises a wrist band;

a GPS assembly for receiving GPS signals from GPS satellites, said GPS assembly comprising:

a pair of GPS antennas for receiving GPS signals, each of said GPS antennas being mounted on said front wall of said housing;

said pair of GPS antennas including an L1 GPS antenna being adapted for receiving GPS signals carrying information about a time of day and information for civilian users;

said pair of GPS antennas including an L2 GPS antenna being adapted for receiving GPS signals carrying military information for use by military users;

each of said pair of GPS antennas comprising a wire ring antenna;

each of said pair of GPS antennas comprising a patch antenna;

a receiver for receiving GPS signals from said pair of GPS antennas, said receiver being mounted in said interior of said housing;

control circuitry being mounted in said interior of said housing for controlling said receiver;

a power supply for selectively providing power to said control circuitry, said power supply being removably mounted in said interior of said housing;

said power supply comprising a rechargeable battery;

an actuating means for controlling said control circuitry, said actuating means being rotatably mounted on said front wall of said housing, said actuating means having a plurality of time zone positions for selecting one of a plurality of time zones, wherein a user may select a particular time zone to determine a time of day in the selected time zone;

a clock display for displaying a time of day, said clock display being mounted on said front wall of said housing such that said pair of GPS antennas are positioned generally adjacent to a perimeter edge of said clock display, said clock display being electrically connected to said control circuitry such that said control circuitry automatically sets the time of day when receiving GPS signals from GPS satellites;

said clock display having a generally circular shape;

said clock display comprising a generally transparent material for allowing a light to pass through said clock display;

wherein said clock display includes numerical indicia being marked on an outer surface of said clock display, said numerical indicia being spaced apart from each other and positioned generally adjacent to a perimeter edge of said clock display;

an hour hand and a minute hand being rotatably mounted on a central portion of said clock display such that said hour and minute hand pointing at said numerical indicia for displaying a time of day to a user;

a motor being mounted in said interior of housing for turning said hour and minute hands, said motor being operationally coupled to said hour and minute hand and electrically connected to said control circuitry;

a second hand being mounted on said motor, said second hand being adapted to act as a compass, wherein said actuating means is positionable from one of said plurality of time zone positions to a compass position, wherein said compass position is characterized by said second hand pointing in a Northerly direction.

a crystal for protecting said clock display, said crystal being mounted on said front wall of said housing such that said clock display being positioned between said crystal and said housing;

said crystal comprising a transparent material such that said clock display is visible through said crystal a solar panel for converting the light passing through said clock display into an electric current, said solar panel being mounted in said interior of said housing, said solar panel being positioned generally adjacent to said clock display, said solar panel being electrically connected to said control circuitry;

said solar, panel comprising a photovoltaic cell;

a positioning display assembly for displaying to a user the user's positioning on the Earth's surface, said positioning display assembly being electrically connected to said control circuitry, said positioning display assembly comprising:

a longitudinal display for displaying to a user the user's positioning with respect to a Prime Meridian of the Earth, said longitudinal display being mounted on said clock display;

a latitudinal display for displaying to a user the user's positioning with respect to an Equator of the Earth, said latitudinal display being mounted on said clock display and positioned generally adjacent to said longitudinal display;

an altitudinal display for displaying to a user the user's altitude with respect to a mean sea level, said altitudinal display being mounted on said clock display and positioned generally adjacent to said latitudinal display;

wherein said longitudinal, latitudinal and altitudinal displays are used by a user to determine the user's position on the Earth's surface;

a velocity display for displaying to a user the user's velocity between a pair of points traveled by the user, said velocity display being mounted on said clock display and positioned generally adjacent to said altitudinal and longitudinal displays, said velocity display being electrically connected to said control circuitry;

wherein said latitudinal longitudinal, altitudinal and velocity displays include numerical indicia marked thereon for indicating a latitude, longitude, altitude and velocity, said numerical indicia for each of said displays being generally spaced apart and being positioned generally adjacent to a perimeter edge of each of said displays; and wherein said latitudinal, longitudinal, altitudinal and velocity displays include at least one indicator hand for pointing at said numerical indicia on each of said displays for indicating a latitude, longitude, altitude and velocity to a user.

* * * * *